United States Patent [19]

Kunze

[11] Patent Number: 4,750,066
[45] Date of Patent: Jun. 7, 1988

[54] GROUNDING FOR MAGNETIC HEAD UNIT IN A PLASTIC MOUNT

[75] Inventor: Norbert Kunze, Ehringshausen, Fed. Rep. of Germany

[73] Assignee: U.S. Philips Corporation, New York, N.Y.

[21] Appl. No.: 864,168

[22] Filed: May 16, 1986

[30] Foreign Application Priority Data

May 21, 1985 [DE] Fed. Rep. of Germany ....... 3518126

[51] Int. Cl.[4] .................. G11B 5/48; G11B 21/16; G11B 15/60
[52] U.S. Cl. ................. 360/104; 360/130.33; 360/130.3
[58] Field of Search ............... 360/109, 104, 129, 110, 360/130.3–130.34

[56] References Cited

U.S. PATENT DOCUMENTS

| | | | |
|---|---|---|---|
| 2,886,652 | 5/1959 | Davis | 360/129 |
| 2,911,483 | 11/1959 | Dopieralski | 360/104 |
| 3,777,070 | 12/1973 | Bump, Jr. | 360/130.33 |
| 4,356,524 | 10/1982 | Watanabe | 360/129 |
| 4,586,098 | 4/1986 | Pretto | 360/104 |
| 4,605,978 | 8/1986 | Zeavin | 360/104 |

FOREIGN PATENT DOCUMENTS

| | | | |
|---|---|---|---|
| 1301903 | 7/1962 | France | 360/129 |
| 56-54669 | 5/1981 | Japan | 360/104 |
| 57-94918 | 6/1982 | Japan | 360/104 |
| 58-133617 | 8/1983 | Japan | 360/129 |
| 59-160810 | 9/1984 | Japan | 360/129 |
| 59-231702 | 12/1984 | Japan | 360/104 |

OTHER PUBLICATIONS

IBM Technical Disclosure Bulletin, vol. 23, No. 7A, Dec. 80, "Retention Means for Head Wire Assembly" by Burns et al., p. 29–52.

Primary Examiner—John H. Wolff
Assistant Examiner—Alfonso Garcia
Attorney, Agent, or Firm—F. Brice Faller

[57] ABSTRACT

Magnetic head unit (1) in a plastic mounting (3) which encloses the magnetic head casing (30) behind the head face (4). The plastic mounting (3) has tape guide elements (7) which guide the magnetic tape moved along the head face (4) in the correct azimuth position. The connecting pins (26) projecting from the rear wall (25) of the head casing (30) are joined to a connecting plate (27), to which the connecting cables (32) are connected. A connecting bracket (28) serving for earthing is provided on the magnetic head casing (30) and is connected to the connecting plate (27) substantially parallel with the connecting pins (26) of the magnetic head casing (30).

7 Claims, 2 Drawing Sheets

GROUNDING FOR MAGNETIC HEAD UNIT IN A PLASTIC MOUNT

BACKGROUND OF THE INVENTION

The invention relates to a magnetic head unit for a magnetic tape apparatus, plastic mount essentially encloses the magnetic head casing behind the head face and has tape guide elements which guide the magnetic tape moved along the head face in the correct azimuth position. The connecting pins projecting from the rear wall of the head casing are joined to a connecting board to which the connecting cables are connected.

This kind of magnetic head unit has been previously disclosed in the patent application EP-A-0120518 to which co-pending U.S. patent application Ser. No. 558,069 filed Dec. 5, 1983 corresponds. The plastic mount of this known magnetic head unit is adhered to the magnetic head prior to the fitting of the latter and encloses it in a ring shape. Tape guide elements are moulded onto the plastic mounting and on adhesion of the mounting are aligned opposite the head face. Such alignment has the object of ensuring that with the aid of these tape guide elements the magnetic tape is always fed in front of the head face in the correct azimuth position. The consequence of this is that in the subsequent fitting of the magnetic head unit onto a head support the adjustment of the tape guide elements in relation to the head mirror is rendered unnecessary. Assembly is thus significantly simplified and may consist, for example, of simply clipping the head unit onto the support. With a suitable economical construction only plastic parts are then envisaged, which make ground between the magnetic head casing and the apparatus more difficult. Since grounding the magnetic head casing is always essential, this is achieved for the known magnetic head unit by means of separate pressure springs, which constitute a special component and must be fitted separately. These springs must also be electrically bonded with a ground lead.

It is also known from EP-A-0120518 for a circuit board to be mounted on the connecting pins projecting from the rear wall of the magnetic head, providing the connection between the magnetic head and the connecting cables. This board does not, however, offer any possibility of grounding the magnetic head casing.

SUMMARY OF THE INVENTION

A grounding bracket is joined to a wall of the magnetic head casing and projects from the magnetic head casing substantially parallel with the connecting pins and is connectable to the connecting board.

The grounding bracket thereby constitutes a rigid grounding contact which projects from the magnetic head casing. Particularly in the case of the wholly plastic supports of magnetic heads this also provides in a simple manner a grounding contact which requires no special fitting. This is of particular importance in the case of magnetic head units for which the azimuth alignment is obtained by adhering the plastic mounting and for which no further screw connections are provided for the magnetic head unit on the support or chassis parts of the apparatus.

In a further embodiment of the invention the grounding bracket joins a side wall of the magnetic head casing and the plastic mounting has a recess in the vicinity of the bracket. There is thus more freedom in the fitting of the bracket to the magnetic head casing, whereby there is no hindrance to adjustment in particular in the azimuth alignment of the head in the head mounting. This is of particular importance if the grounding bracket is a plate connected to the magnetic head casing.

According to a further embodiment of the invention a clamping device is provided on the head mounting for securing the connecting cables. The connecting board is in this way protected against tensile strains from the cable. Locating the connecting bracket close to the clamping device permits a short connection between the cable shield and the bracket.

According to a further embodiment of the invention the clamping device is located in the vicinity of the transition of the side wall of the plastic mounting and the rear wall of the head casing. This position of the clamping device is favourable because it permits a short cable feed.

According to a further embodiment of the invention the clamping device has two cams between which the sheathing of the cable can be clamped. Clamping occurs by means of a simple locking of the cams without any additional screw connection being necessary.

DETAIL DESCRIPTION OF THE PREFERRED EMBODIMENT

Figure 1:
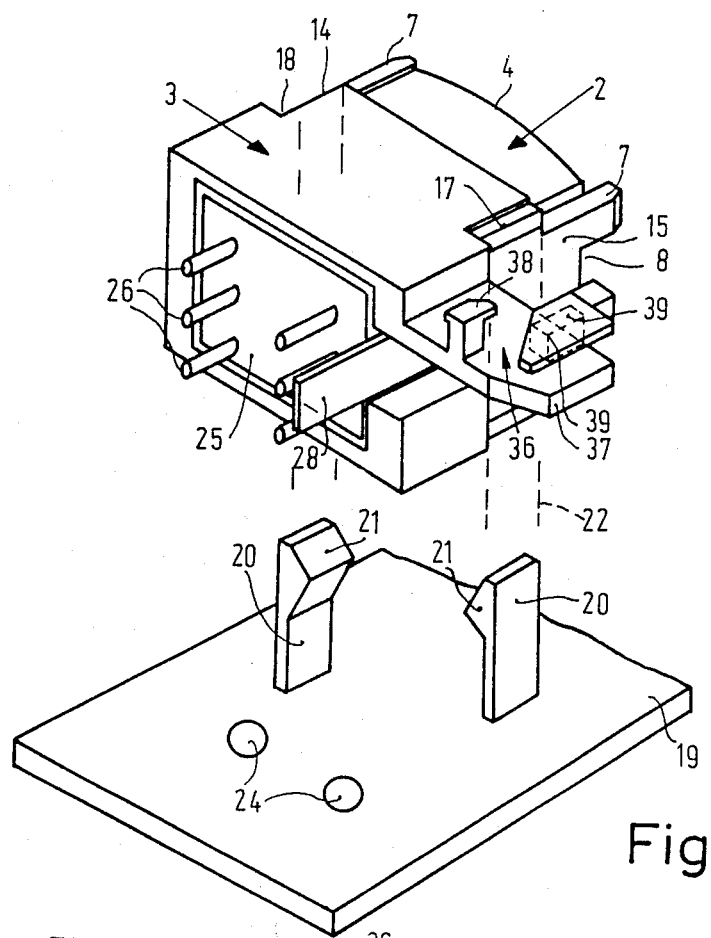
FIG. 1 a shows diagrammatical view of magnetic head unit with a magnetic head support which is part of a magnetic tape apparatus not shown, whereby the support is shown in exploded view beneath the magnetic head unit without connecting board.
Figure 4:
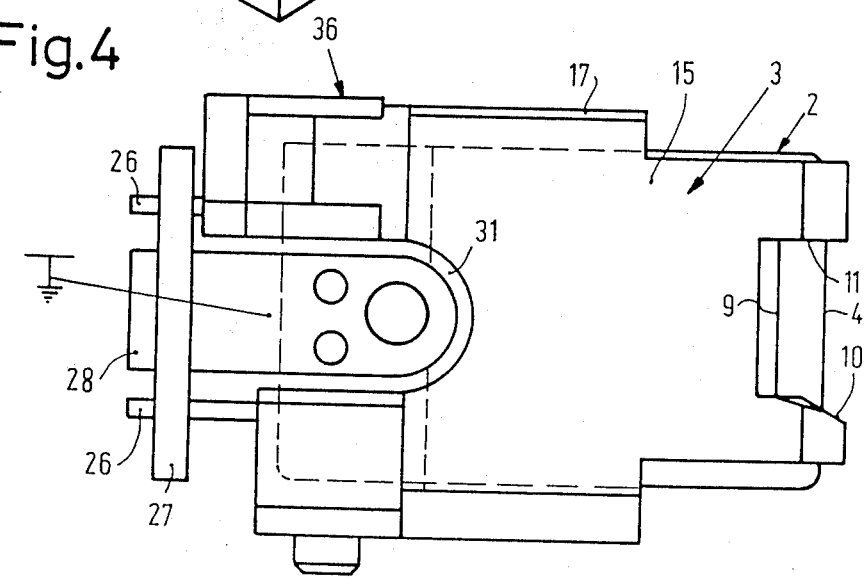
FIG. 4 shows a side elevation of the magnetic head unit viewed from the direction IV according to FIG. 2.
Figure 2:
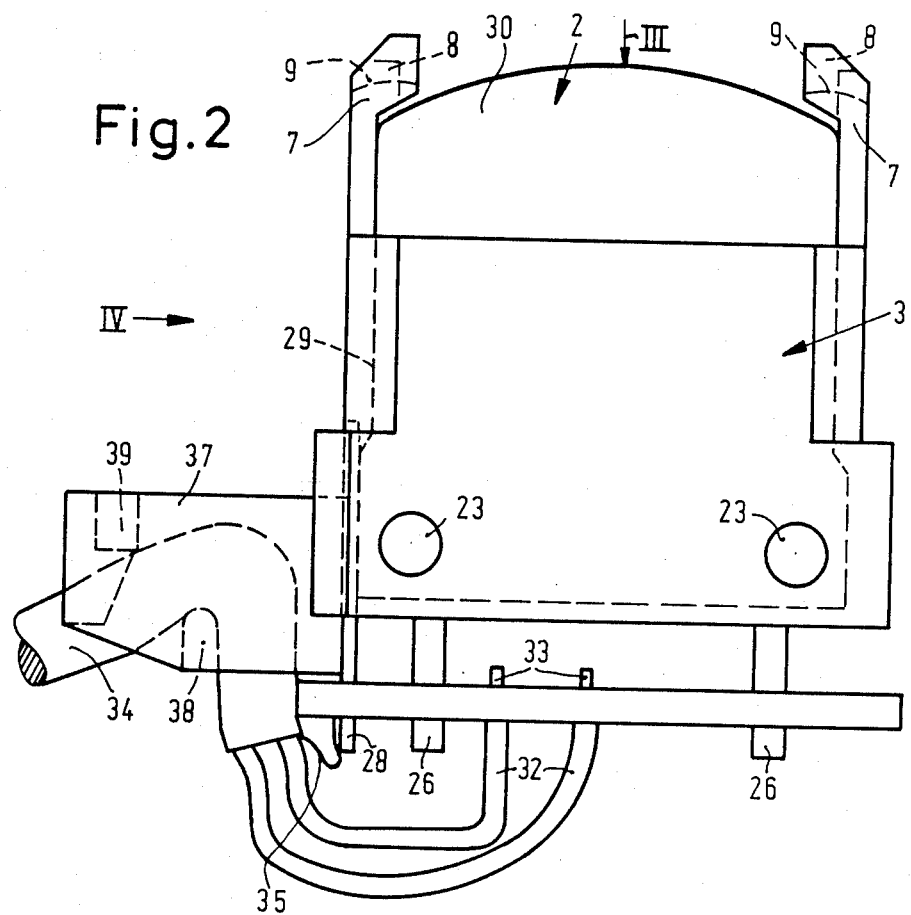
FIG. 2 shows the magnetic head unit with connecting board, viewed from below, on a different scale.
Figure 3:
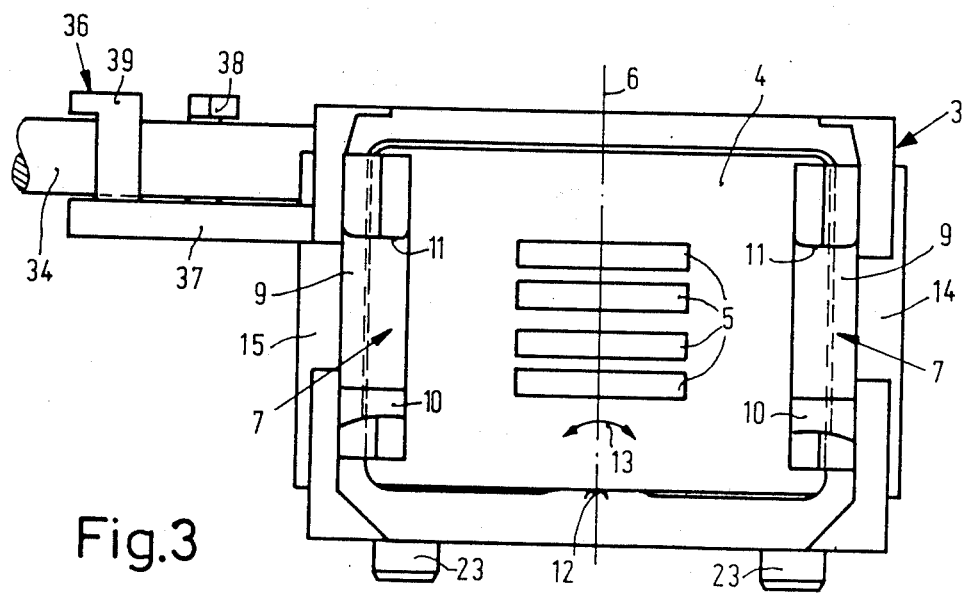
FIG. 3 shows a view of the magnetic head unit from the head face side along arrow III in FIG. 2.

FIG. 1 shows a magnetic head unit with a magnetic head 2 and a plastic mounting 3 enclosing this magnetic head. The plastic mounting 3 encloses the magnetic head 2 behind its head face 4. Within the head face 4 there are head tracks 5 (FIG. 3). Between the individual head tracks there are air gaps which all lie on a centre line 6 running at right-angles to the longitudinal axes of the head tracks 5.

The plastic mounting 3 is provided with tape guide elements 7 which extend up to the head face 4. The tape guide elements 7 have indentations with cylindrical bases 9. The cylindrical bases 9 serve to provide the magnetic tape passed over the head faces 4 with a sufficient rigidity in the vicinity of the tape guide elements 7. The tape guide elements 7 are also provided with curved guide surfaces 10, which serve to cause the magnetic tape to run up against a limiting face 11. The plastic mounting 3 has cutout section with an edge 12, in the form of a type of knife bearing around which the magnetic head 2 can be pivoted inside the plastic mounting 3 prior to its fixing. The pivot direction is indicated in FIG. 3 with a double arrow 13. If a connecting line runs between the limiting faces 11 exactly at right-angles to the line 6, then the magnetic head 2 is precisely aligned within the mounting 3. The azimuth position is thus fixed once and for all inside the mounting. The correct position is secured by the magnetic head 2 being firmly adhered in the mounting 3.

The plastic mounting 3 has side walls 14 and 15 which are provided with recesses 17 and 18. The magnetic head unit 1 is fixed on a support 19, which is part of a magnetic tape apparatus not shown. The support 19 is provided with spring-loaded locking arms 20 which extend from it and have latches 21 at their free ends. If the magnetic head unit 1 is pushed together with the support 19 in the direction of the dashed lines 22, the latches 21 lock into the recesses 17. The magnetic head unit 1 is in this way fixed immovably on the support 19. Screw connections or similar are unnecessary.

Feet 23 are provided on the plastic mounting 3, which fit into the drilled holes 24 of the support 19. The fixing by means of the latches 21 and the feet 23 with the drilled holes 24 ensures a perfect alignment of the magnetic head unit 1 on the support 19. The support 19 with locking arms 20 and latches 21 is preferably manufactured according to the outsert moulding technique.

From the rear wall 25 of the magnetic head 2 extend aligned connecting pins 26 in parallel with each other to the rear. These connecting pins are mounted on a connecting board 27 and soldered to circuit traces on the board. In the same way a connecting bracket 28 is inserted through the connecting board 27, the bracket being located on a side wall 29 of the magnetic head casing 30. This connecting bracket 28 is either a part of the magnetic head casing 30 itself, in that it is cut out from this casing, or it is welded onto the side wall 29. The connecting bracket 28 runs parallel to the connecting pins 26 and can thus be inserted together with the connecting pins 26 through the connecting board 27. The connecting bracket 28 is arranged in a cutout section 31 in the plastic mounting 3 and has sufficient clearance there that in alignment it cannot come into contact with the edges of the plastic mounting.

For the connection to the electronic system of the magnetic tape apparatus individual cables 32 are used, of which the ends 33 are soldered to circuit traces on board 27. The cables 32 are enclosed in a common sheathing 34, which is provided with a shield 35. The shield 35 is connected electrically to the connecting board 27 and via the latter to the connecting bracket 28.

A clamping device 36 is provided on the plastic mounting 3, which is moulded directly onto the plastic mounting. This clamping device is located on an extension plate 37. This extension plate 37 is provided in the vicinity of the transition of the side wall 15 of the plastic mounting 3 and the rear wall 25. The clamping device also comprises two cams 38 and 39, between which the sheathing 34 of the cables 32 can be clamped. Care has been taken to ensure that the cables are clamped in the vicinity of the connecting bracket 28 so that the shield 35 can be connected to the connecting bracket 28 via the shortest route.

What is claimed is:

1. Magnetic head unit for mounting in a magnetic tape apparatus and for being electrically connected thereto by means of connecting cables, said unit comprising
   a magnetic head having a head face, an opposed rear wall, and a sidewall extending therebetween, said rear wall having connecting pins extending therefrom,
   a plastic head mount which essentially encloses the magnetic head behind the head face, said mounting having tape guide elements for guiding a magnetic tape moved across the head face, said head being positioned in said mount so that the tape is moved across the head in correct azimuth alignment,
   a grounding bracket fixed to said sidewall of said head and projecting substantially parallel to said connecting pins, said mount being recessed so that said bracket cannot come into contact therewith during positioning of said head relative thereto.

2. A magnetic head unit as in claim 1 further comprising a connecting board joined to said connecting pins, said electrical cables being connected to said board.

3. Magnetic head unit according to claim 1, characterized in that grounding bracket is a plate connected to the magnetic head.

4. Magnetic head unit according to claim 1, characterized in that the plastic mount is provided with a clamping device which is molded integrally with the head mount, whereby the clamping device fixes the connecting cables.

5. Magnetic head unit according to claim 4, characterized in that grounding bracket is provided close to the clamping device.

6. Magnetic head unit according to claim 5, characterized in that the clamping device is located in the vicinity of the side wall and the rear wall of the head.

7. Magnetic head unit according to claim 4, characterized in that the clamping device has two cams between which the cables can be clamped.

* * * * *